United States Patent
Younsi et al.

(10) Patent No.: US 7,548,016 B2
(45) Date of Patent: Jun. 16, 2009

(54) DIELECTRIC BARRIER DISCHARGE DEVICE

(75) Inventors: Abdelkrim Younsi, Ballston Lake, NY (US); Seyed Gholamali Saddoughi, Clifton Park, NY (US); Grover Bennett, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 423 days.

(21) Appl. No.: 11/466,586

(22) Filed: Aug. 23, 2006

(65) Prior Publication Data

US 2008/0047428 A1     Feb. 28, 2008

(51) Int. Cl.
*H01J 63/04* (2006.01)

(52) U.S. Cl. .................................... 313/491

(58) Field of Classification Search ......... 313/582–587, 313/491
See application file for complete search history.

(56) References Cited

U.S. PATENT DOCUMENTS

| 2004/0183467 | A1* | 9/2004 | Bschorer | 315/246 |
| 2005/0046351 | A1* | 3/2005 | Kweon | 313/582 |

* cited by examiner

*Primary Examiner*—Toan Ton
*Assistant Examiner*—Hana A Sanei
(74) *Attorney, Agent, or Firm*—Francis T. Coppa

(57) ABSTRACT

A dielectric barrier discharge device for generating a plasma discharge is disclosed. The device includes a first electrode, a second electrode separated from the first electrode, and a dielectric material disposed between the two electrodes. Each electrode has a first end, a first surface, and a second surface. The first end of the first electrode is disposed proximate to the first end of the second electrode. The first end of the first electrode comprises a set of saw-tooth features disposed between the surfaces configured to stabilize location of streamers of the plasma discharge upon generation thereof.

16 Claims, 3 Drawing Sheets

DIELECTRIC BARRIER DISCHARGE DEVICE

BACKGROUND OF THE INVENTION

The present disclosure relates generally to plasma actuators, and particularly to dielectric barrier discharge devices.

Dielectric barrier discharge devices are known to create a plasma discharge in response to application of a high voltage between two electrodes. The high voltage causes charged particles to move with the electric field, breaking down the air into a partially ionized gas, which is known as plasma. The charged particles collide with neutral atoms and molecules, thereby transferring momentum, to provide a convective motion (flow) of the air along the plasma discharge in response to the collision of charged particles.

Operational factors, such as high frequency, and low environmental absolute pressure may result in the presence of plasma filaments, also known as channels, streaks, and streamers, in the plasma discharge. The quantity and intensity of the streamers are in direct proportion to the power source frequency and voltage level. Operation duty cycle and atmospheric pressure can also have an effect on the plasma aspect and characteristics. The location of such streamers within the plasma discharge is random, unstable, and erratic. Accordingly, the state of the art will be advanced by a dielectric barrier discharge device that overcomes these drawbacks.

BRIEF DESCRIPTION OF THE INVENTION

An embodiment of the invention includes a dielectric barrier discharge device for generating a plasma discharge. The device includes a first electrode, a second electrode separated from the first electrode, and a dielectric material disposed between the two electrodes. Each electrode has a first end, a first surface, and a second surface. The first end of the first electrode is disposed proximate to the first end of the second electrode. The first end of the first electrode comprises a set of saw-tooth features disposed between the surfaces configured to stabilize location of streamers of the plasma discharge upon generation thereof.

BRIEF DESCRIPTION OF THE DRAWINGS

Referring to the exemplary drawings wherein like elements are numbered alike in the accompanying Figures.

DETAILED DESCRIPTION OF THE INVENTION

An embodiment of the invention provides a dielectric barrier discharge device with an electrode having a saw-tooth, or substantially pointed, profile. As used herein, the term substantially pointed is intended to encompass a saw-tooth arrangement that does not necessarily terminate in an absolute point, but may have a degree of roundness to it, yet still perform as disclosed herein. These devices may be used for flow control, plasma assisted combustion, and within pulse detonation engines. The saw-tooth profile stabilizes the streamers of the plasma discharge, which may be created by pulsed power around predefined and pre-located high stress points on the edge of the electrode. The saw-tooth features will exhibit a divergent electric field with a maximum strength at the tooth tip. Plasma streamers will be fixed at the tips of the teeth and have a more uniform distribution along the actuator electrode length. While the main application of the disclosed dielectric barrier discharge device is for applications in air, it can be also used in other gaseous or liquid mediums.

Figure 1:
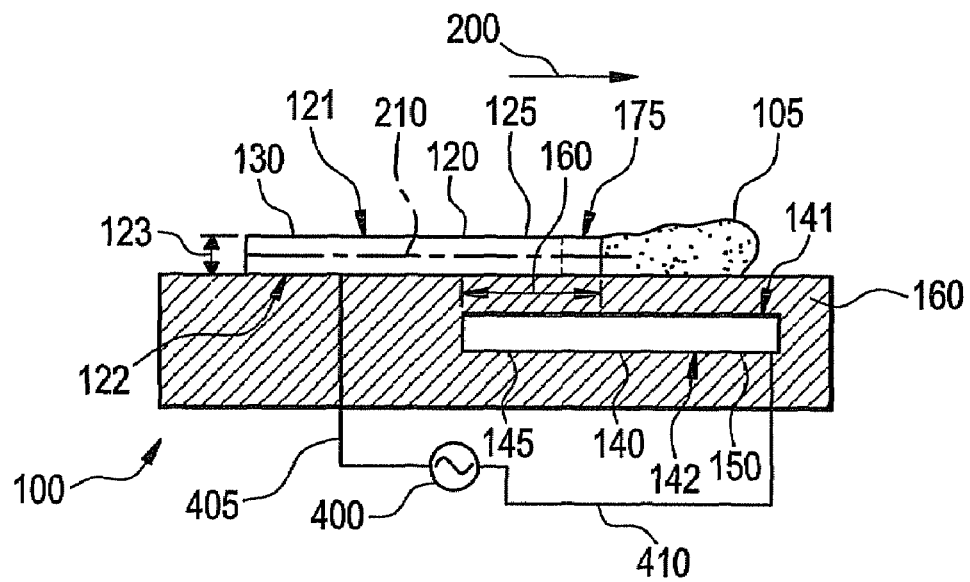
FIG. 1 depicts a front cross section schematic of a dielectric barrier discharge device in accordance with an embodiment of the invention.

Referring now to FIG. 1, a front cross-section view of an embodiment of a dielectric barrier discharge device 100 for generating a plasma discharge 105 is depicted. The device 100 comprises a first electrode 120 and a second electrode 140. The first electrode 120 is separated from the second electrode 140 by a solid dielectric material 160 disposed between the two electrodes 120, 140. A voltage source 400 is connected to the first electrode 120 via a conductor 405 and to the second electrode 140 via a conductor 410. In an embodiment, the second electrode 140 is encapsulated by the dielectric material 160, as depicted in FIG. 1. The first electrode 120 has a first end 125 and a second end 130. The second electrode 140 has a first end 145 and a second end 150. In an embodiment, the first electrode 120 comprises a first surface 121 and a second surface 122, defining a thickness 123 therebetween, and the second electrode 140 comprises a first surface 141 and a second surface 142. In an embodiment, the first end 125 of the first electrode 120 is disposed proximate to the first end 145 of the second electrode 140, and the first electrode 120 and the second electrode 140 are configured to generate an electric field that is tangential, or directed outward from the first end 125 of the first electrode 120 toward the second electrode 140, to the plasma discharge 105, as is shown by a direction line indicated by reference numeral 200.

In an embodiment, the first electrode 120 is oriented parallel to the second electrode 140. In another embodiment, the first end 125 of the first electrode 120 overlaps the first end 145 of the second electrode 140, as is depicted by reference numeral 160.

While an embodiment of the invention has been depicted showing an overlap between the first end of the first electrode and the first end of the second electrode, it will be appreciated that the scope of the invention is not so limited, and the invention will also apply to plasma actuators providing other arrangements of the electrodes, such as an alignment of, or a separation between, the first ends of the first and second electrodes, for example.

Figure 2:
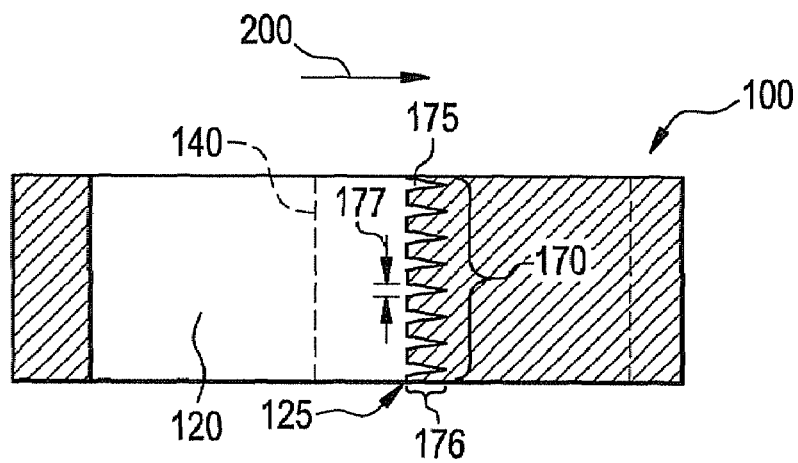
FIG. 2 depicts a top view of a dielectric barrier discharge device in accordance with an embodiment of the invention.

Referring now to FIG. 2, a top view of an embodiment of the device 100 is shown. In an embodiment, the first end 125 of the first electrode 120 comprises a set 170 of saw-tooth features 175 directed outward from the first end 125, such as to extend the overall length of the first electrode as indicated by the direction line 200, and configured to stabilize location of streamers of the plasma discharge 105 upon generation thereof. In an embodiment, each tooth of the saw-tooth features 175 is greater than or equal to 0.1 millimeter (mm) in height 176 and width 177, and less than or equal to 1 centimeter (cm) in height 176 and width 177.

While an embodiment has been depicted having saw-tooth features with a regular, periodic distribution, it will be appreciated that the scope of the invention is not so limited, and that the invention will also apply to electrodes having other distributions of teeth, such as a random distribution, for example.

Referring back now to FIG. 1, in an embodiment, the first surface 121 of the first electrode 120 is parallel to the second surface 122 of the first electrode 120. In an embodiment, the surfaces 121, 122 of the first electrode 120 and the surfaces 141, 142 of the second electrode are flat surfaces 121, 122, 141, 142, each surface 121, 122, 141, 142 thereby defining a plane. In an embodiment at least one of the two surfaces 121, 122 of the first electrode 120 is parallel to at least one of the two surfaces 141, 142 of the second electrode 140.

While an embodiment has been described as having electrodes with flat surfaces, it will be appreciated that the scope of the invention is not so limited, and that the invention will also apply to electrodes having surfaces with other geometry, such as curves, arcs, or other shapes that may have symmetry about an axis, for example. While an embodiment has been described as having a first electrode and a second electrode that are parallel to each other, it will be appreciated that the scope of the invention is not so limited, and that the invention will also apply to dielectric barrier discharge devices having other electrode arrangements, such as generally approaching or departing, with a decreasing or increasing separation distance, for example. While an embodiment has been described as having a first electrode with parallel surfaces, it will be appreciated that the scope of the invention is not so limited, and that the invention will also apply to electrodes having surfaces that may converge, or diverge, to provide a dielectric barrier discharge device with varying thickness or a varying gas gap between the two electrodes, for example.

In an embodiment, the saw-tooth features 175 are the same thickness 123 as the first electrode 120, disposed between the surfaces 121, 122 of the first electrode 120, and extend in a direction tangential to the first end 125 of the first electrode 120, as is illustrated by the direction line indicated by reference numeral 200. As used herein, the term "tangential to the first end 125 of the first electrode 120" refers to a set 170 of saw-tooth features 175 that extend beyond the first end 125 of the first electrode 120 in a direction aligned with a central axis 210 of the first electrode 120. Stated alternatively, in an embodiment, the saw-tooth features 175 extend in a direction parallel, or co-planar, to the surfaces 121, 122 of the first electrode 120.

While an embodiment has been described having saw-tooth features that are the same thickness of the first electrode, it will be appreciated that the scope of the invention is not so limited, and that the invention will also apply to electrodes having saw-tooth features that vary in thickness relative to the electrode, such as saw-tooth features that are thicker or saw tooth features that are thinner than the electrode, for example.

Figure 3:
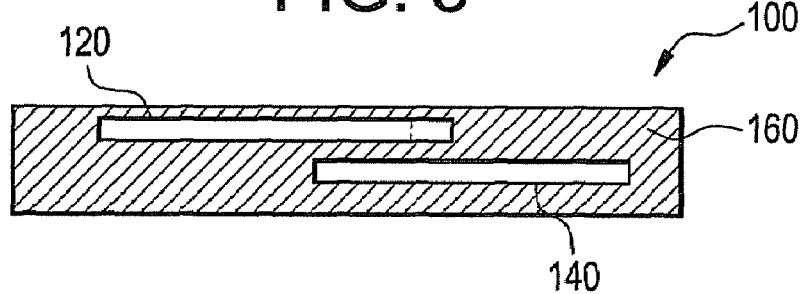
FIG. 3 depicts a cross section schematic of a dielectric barrier discharge device in accordance with an embodiment of the invention.

Referring now to FIG. 3, in another embodiment, the first electrode 120 is encapsulated by the dielectric material 160.

Figure 4:
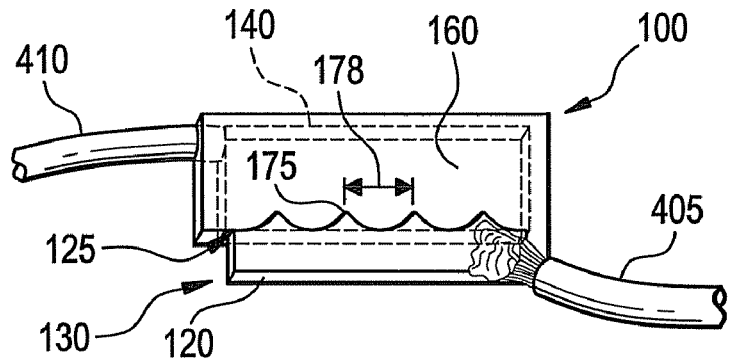
FIG. 4 depicts a top perspective view of a dielectric barrier discharge device in accordance with an embodiment of the invention.

Referring now to FIG. 4, an exemplary embodiment of the device 100 is depicted. The first electrode 120 is connected to the conductor 405 and disposed above the dielectric material 160. The dielectric material 160 is disposed above the second electrode 140 (depicted by hidden lines), which is connected to the power source 400 (best seen by reference to FIG. 1) via the conductor 410. It may be appreciated that in the embodiment depicted, there are four saw-tooth features 175, with a spacing indicated by reference numeral 178, which extend from the first end 125 of the first electrode 120.

Figure 5:
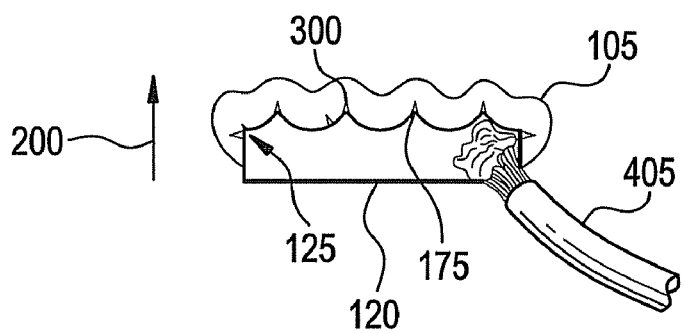
FIG. 5 depicts a top perspective view of a plasma discharge generated by the electrode of FIG. 4 at a first power frequency in accordance with an embodiment of the invention.

Referring now to FIG. 5, an exemplary embodiment of the first electrode 120 depicted in FIG. 4, creating the plasma discharge 105 is depicted. It will be appreciated that the plasma discharge 105 is directed tangentially outward from the first end 125 of the first electrode 120, as indicated by the direction line 200. The presence of streamers 300 may be seen to be located with respect to the saw tooth features 175. Furthermore, it is observed in operation that the streamers 300 remain stable in location with respect to time. The exemplary embodiment depicted in FIG. 5 illustrates the plasma discharge 105 and streamers 300 generated in response to the voltage source 400 having a first, low frequency.

Figure 6:
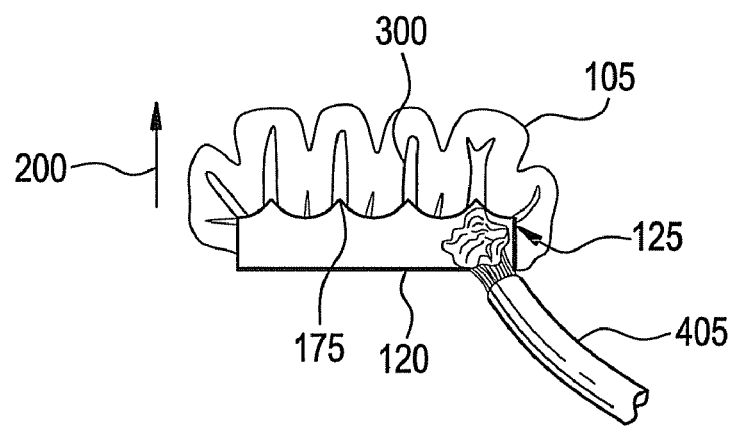
FIG. 6 depicts a top perspective view of a plasma discharge generated by the electrode of FIG. 4 at a second power frequency in accordance with an embodiment of the invention.

Referring now to FIG. 6, an exemplary embodiment of the first electrode 120 depicted in FIG. 4, creating the plasma discharge 105 is depicted. It will be appreciated that the plasma discharge 105 is directed tangentially outward from the first end 125 of the first electrode 120, as indicated by the direction line 200. The presence of streamers 300 may be seen to be located with respect to the saw tooth features 175. Furthermore, it is observed in operation that the streamers 300 remain stable in location with respect to time. The exemplary embodiment depicted in FIG. 6 illustrates the plasma discharge 105 and streamers 300 generated in response to the voltage source 400 having a second, high frequency.

Figure 7:
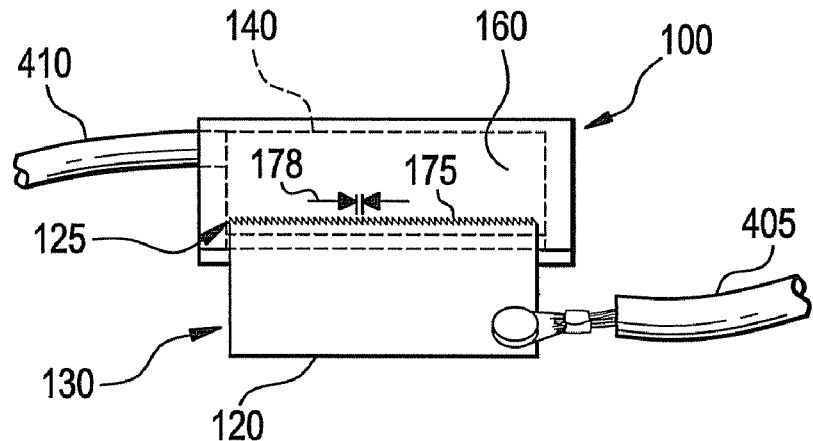
FIG. 7 depicts a top perspective view of a dielectric barrier discharge device in accordance with an embodiment of the invention.

Referring now to FIG. 7, an exemplary embodiment of the device 100 is depicted. The first electrode 120 is connected to the conductor 405 and disposed above the dielectric material 160. The dielectric material 160 is disposed above the second electrode 140 (depicted by hidden lines), which is connected to the power source 400 (best seen by reference to FIG. 1) via the conductor 410. It will be appreciated that in the embodiment depicted, there are many saw-tooth features 175 with the spacing indicated by reference numeral 178, which extend from the first end 125 of the first electrode 120.

Figure 8:
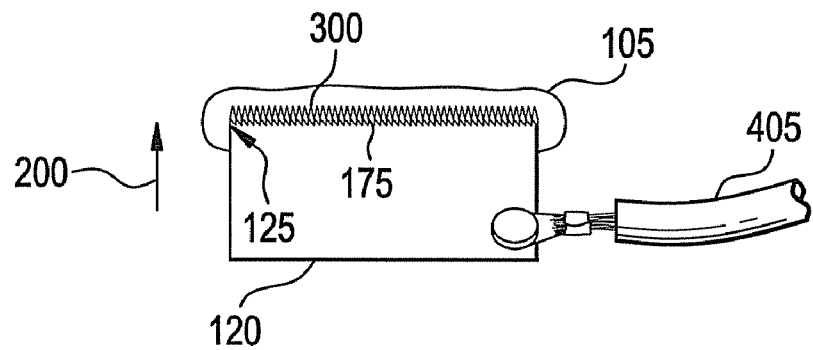
FIG. 8 depicts a top perspective view of a plasma discharge generated by the electrode of FIG. 7 at a first power frequency in accordance with an embodiment of the invention.

Referring now to FIG. 8, an exemplary embodiment of the first electrode 120 depicted in FIG. 7, creating the plasma discharge 105 is depicted. It will be appreciated that the plasma discharge 105 is directed tangentially outward from the first end 125 of the first electrode 120, as indicated by the direction line 200. The presence of streamers 300 may be seen to be located with respect to the saw tooth features 175. Furthermore, it is observed in operation that the streamers 300 remain stable in location with respect to time. The exemplary embodiment depicted in FIG. 8 illustrates the plasma discharge 105 and streamers 300 generated in response to the voltage source 400 having the first, low frequency.

Figure 9:
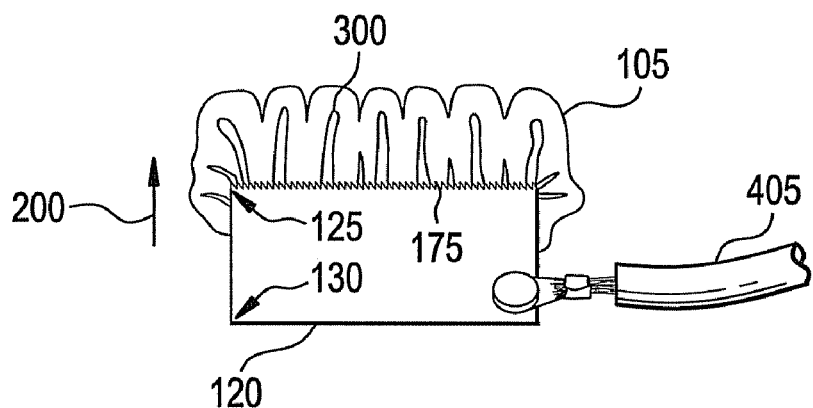
FIG. 9 depicts a top perspective view of a plasma discharge generated by the electrode of FIG. 7 at a second power frequency in accordance with an embodiment of the invention.

Referring now to FIG. 9, an exemplary embodiment of the first electrode 120 depicted in FIG. 7, creating the plasma discharge 105 is depicted. It will be appreciated that the plasma discharge 105 is directed tangentially outward from the first end 125 of the first electrode 120, as indicated by the direction line 200. The presence of streamers 300 may be seen to be located with respect to the saw tooth features 175. Furthermore, it is observed in operation that the streamers 300 remain stable in location with respect to time. The exemplary embodiment depicted in FIG. 9 illustrates the plasma discharge 105 and streamers 300 generated in response to the voltage source 400 having the second, high frequency.

As disclosed, some embodiments of the invention may include some of the following advantages: the ability to distribute the location of plasma discharge streamers more uniformly within the plasma discharge; and the ability to stabilize the location of plasma discharge streamers within the plasma discharge.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A dielectric barrier discharge device for generating a plasma discharge comprising a plurality of streamers, the device comprising:
   a first electrode having a first end, a first surface, and a second surface;
   a second electrode having a first end, a first surface, and a second surface, the second electrode separated from the first electrode; and
   a dielectric material disposed between the two electrodes;
   wherein the first end of the first electrode is disposed proximate to the first end of the second electrode; and
   wherein the first end of the first electrode comprises a set of saw-tooth features disposed between the surfaces, the set of saw-tooth features being exposed to the plurality of streamers and stabilizing the location of the plurality of streamers of the plasma discharge upon generation thereof.

2. The device of claim 1, wherein:
   the first electrode and the second electrode generate an electric field tangential to the plasma discharge.

3. The device of claim 1, wherein:
   the second electrode is encapsulated by the dielectric material.

4. The device of claim 1, wherein:
   the first electrode is encapsulated by the dielectric material.

5. The device of claim 1, wherein:
   the first electrode is oriented parallel to the second electrode.

6. The device of claim 1, wherein:
   the first end of the first electrode overlaps the first end of the second electrode.

7. The device of claim 1, wherein:
   the saw-tooth features extend in a direction tangential to the first end of the first electrode.

8. The device of claim 1, wherein:
   the saw-tooth features are directed outward from the first end of the first electrode.

9. The device of claim 1, wherein:
   each tooth of the saw-tooth features is greater than or equal to 0.1 millimeter (mm) in height and width; and
   each tooth of the saw-tooth features is less than or equal to 1 centimeter (cm) in height and width.

10. The device of claim 1, wherein:
    at least one surface of the first electrode is parallel to at least one surface of the second electrode.

11. The device of claim 1, wherein:
    the surfaces of the first electrode and the surfaces of the second electrode are flat surfaces.

12. The device of claim 11, wherein:
    the saw-tooth features extend in a direction parallel to the surfaces of the first electrode.

13. The device of claim 11, wherein:
    the first surface of the first electrode is parallel to the second surface of the first electrode.

14. The device of claim 1, wherein:
    the first surface of the first electrode is parallel to the second surface of the first electrode.

15. The device of claim 14, wherein:
    the surfaces of the first electrode are parallel to at least one surface of the second electrode.

16. The device of claim 15, wherein:
    the surfaces of the first electrode and the surfaces of the second electrode are flat surfaces.

* * * * *